US 12,258,137 B2

(12) United States Patent
Beutin et al.

(10) Patent No.: US 12,258,137 B2
(45) Date of Patent: Mar. 25, 2025

(54) ASSEMBLY FOR SUPPORTING AN ACCESSORY GEARBOX OF AN AIRCRAFT TURBINE ENGINE

(71) Applicant: SAFRAN AIRCRAFT ENGINES, Paris (FR)

(72) Inventors: Bruno Albert Beutin, Moissy-Cramayel (FR); Alexis Pereira, Moissy-Cramayel (FR); Zoltan Zsiga, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/563,040

(22) PCT Filed: May 20, 2022

(86) PCT No.: PCT/FR2022/050965
§ 371 (c)(1),
(2) Date: Nov. 21, 2023

(87) PCT Pub. No.: WO2022/248795
PCT Pub. Date: Dec. 1, 2022

(65) Prior Publication Data
US 2024/0270396 A1 Aug. 15, 2024

(30) Foreign Application Priority Data
May 27, 2021 (FR) .................... 2105532

(51) Int. Cl.
*B64D 27/40* (2024.01)
*F02C 7/20* (2006.01)
(Continued)

(52) U.S. Cl.
CPC ......... *B64D 27/406* (2024.01); *B64D 27/402* (2024.01); *F02C 7/20* (2013.01);
(Continued)

(58) Field of Classification Search
CPC ......... F02C 7/32; B64D 27/40; B64D 27/402; B64D 27/404
See application file for complete search history.

(56) References Cited

U.S. PATENT DOCUMENTS 4,065,077 A * 12/1977 Brooks .................. B64D 27/40
60/797
4,068,470 A 1/1978 Sargisson et al.
(Continued)

FOREIGN PATENT DOCUMENTS

FR 3114129 A1 * 3/2022

OTHER PUBLICATIONS

International Search Report (with English translation) mailed Sep. 15, 2022, issued in corresponding International Application No. PCT/FR2022/050965, filed May 20, 2022, 5 pages total.
(Continued)

*Primary Examiner* — Todd E Manahan
*Assistant Examiner* — Marc Amar
(74) *Attorney, Agent, or Firm* — CHRISTENSEN O'CONNOR JOHNSON KINDNESS PLLC (57) ABSTRACT

A support assembly for supporting a main accessory gearbox of an aircraft turbine engine, the accessory gearbox including gears and supporting at least one item of equipment driven by the gears. The support assembly can include a structure for connecting and supporting the turbine engine to a pylon of the aircraft including: an intermediate axial portion for attachment to the pylon, having an upper end that defines a linking interface with the pylon, the intermediate axial portion bearing suspension rods, which are intended to be connected to the turbine engine; a front axial portion extending forward of the intermediate portion and having at least one suspension member configured to be connected to the turbine engine; and a rear axial portion extending (Continued)

rearwards of the intermediate portion and supporting the main accessory gearbox.

16 Claims, 8 Drawing Sheets

(51) Int. Cl.
    *F02C 7/32*     (2006.01)
    *F02C 7/36*     (2006.01)

(52) U.S. Cl.
    CPC ............... *F02C 7/32* (2013.01); *F02C 7/36* (2013.01); *F05D 2220/76* (2013.01); *F05D 2260/4031* (2013.01)

(56) References Cited

U.S. PATENT DOCUMENTS

| | | | |
|---|---|---|---|
| 5,687,561 A | | 11/1997 | Newton |
| 6,474,597 B1* | | 11/2002 | Cazenave ............ B64D 27/18 244/54 |
| 2006/0248900 A1* | | 11/2006 | Suciu ................ F02C 7/36 60/802 |
| 2010/0059633 A1* | | 3/2010 | Pohl ................ B64C 9/16 244/215 |
| 2011/0127368 A1* | | 6/2011 | Penda ............... B64D 27/40 244/54 |
| 2011/0289936 A1* | | 12/2011 | Suciu ............... F02C 7/32 60/802 |
| 2012/0224950 A1* | | 9/2012 | Fert ................ F02C 7/32 415/121.3 |
| 2016/0167798 A1* | | 6/2016 | Prentice ............ B64D 27/40 244/54 |
| 2017/0043878 A1* | | 2/2017 | Pautis ............... B64D 27/12 |
| 2017/0088279 A1* | | 3/2017 | Castelli ............. B64D 27/18 |
| 2018/0105278 A1* | | 4/2018 | El Ghannam ......... F02C 6/206 |
| 2019/0218977 A1 | | 7/2019 | Muldoon |
| 2021/0355870 A1* | | 11/2021 | Lefebvre ............ F02C 7/36 |
| 2023/0356853 A1* | | 11/2023 | Cline ................ B64D 27/40 |

OTHER PUBLICATIONS

Written Opinion (with English translation) mailed Sep. 15, 2022, issued in corresponding International Application No. PCT/FR2022/050965, filed May 20, 2022, 8 pages total.

\* cited by examiner

(PRIOR ART)

ASSEMBLY FOR SUPPORTING AN ACCESSORY GEARBOX OF AN AIRCRAFT TURBINE ENGINE

CROSS-REFERENCE TO RELATED APPLICATIONS

This application is a National Stage of International Application No. PCT/FR2022/050965, filed May 20, 2022, which claims priority to French Patent Application No. 2105532, filed May 27, 2021, the entire disclosures of which are hereby incorporated by reference in their entirety for all purposes.

TECHNICAL FIELD OF THE INVENTION

The present invention relates to a support assembly for supporting the main accessory gearbox of an aircraft turbine engine.

TECHNICAL BACKGROUND

The technical background comprises in particular the documents U.S. Pat. No. 4,068,470, US-A1-2019/218977 and U.S. Pat. No. 5,687,561.

An aircraft turbine engine comprises a gas generator which typically comprises, from upstream to downstream, with reference to the flowing of the gases in the turbine engine, at least one compressor, an annular combustion chamber and at least one turbine. In the case of a low-pressure and high-pressure turbofan engine with double body, the gas generator comprises a low-pressure compressor, a high-pressure compressor, the combustion chamber, the high-pressure turbine and the low-pressure turbine. The gas generator defines an annular flow duct for a gas flow, referred to as the primary flow, which passes through the compressors, the combustion chamber and the turbines.

The rotor of the high-pressure compressor is connected to the rotor of the high-pressure turbine by a high-pressure shaft. The rotor of the low-pressure compressor is connected to the rotor of the low-pressure turbine by a low-pressure shaft which passes through the high-pressure shaft and which drives in rotation a propulsion propeller located generally upstream of the gas generator.

When this propeller is shrouded and therefore surrounded by an annular casing, referred to as the fan casing, this propeller is referred to as the fan and generates a flow of air which flows around the gas generator and is referred to as the secondary flow. When the propeller is not shrouded, it also generates an air flow that flows around the gas generator.

The turbine engine is attached to an element of the aircraft, such as a wing or the fuselage, by means of an hooking or attachment pylon, also referred to as a mast. This pylon is generally elongated in shape and comprises a beam extending parallel to the longitudinal axis of the turbine engine. If the turbine engine is attached under a wing of the aircraft, the pylon is located at 12 o'clock (12 hours) by analogy with the face of a clock.

In the current technique, the pylon comprises upstream attachment and suspension members for attaching or suspending the turbine engine that are dedicated to one type of turbine engine and cannot be used for another type of turbine engine. These attachment members are intended, for example, to be attached to the fan casing of a turbine engine, which surrounds the fan propeller, and therefore cannot be used for a turbine engine with an non-shrouded propeller because this turbine engine does not comprise a fan casing.

In addition, the attachment pylon can comprise downstream attachment members for attaching and suspending the downstream end of a turbine engine. However, this configuration causes its disadvantages. During operation, the gas generator ensures a transmission of the stresses between the upstream and downstream attachment points on the pylon, resulting in deformation of the generator and the gas and in changes to the clearances between the rotors and the stators of the gas generator. The gas generator is therefore subject to a moment generated by the axial stresses (off-axis thrust and thrust-reacting). The turbine engine is also subject to a moment generated by the asymmetry of axial stresses on the vanes of the fan propeller, and to stresses resulting from the capture of air (sleeve stresses) by the turbine engine.

It is therefore understandable that the performance and the operability of the turbine engine may be affected by these stresses.

One solution to this problem would be to attach in a cantilever manner the turbine engine to the pylon. This would mean suspending a front or upstream portion of the turbine engine from the pylon and leaving the rear or downstream portion of the turbine engine, such as its turbine casing, free.

Another problem relates to hoisting the turbine engine from a ground-based storage station to the pylon to which the turbine engine is intended to be attached. The hoisting of a turbine engine may require movements in several directions until the turbine engine comes alongside the pylon and can be attached to the pylon.

Another disadvantage of the current technology relates to the position and mounting of the main accessory gearbox on the gas generator. In this application, "accessory gearbox" means a gearbox that carries and drives items of equipment or accessories of the turbine engine, such as a pump, a generator, etc. This accessory gearbox is commonly referred to as an AGB. This accessory gearbox is commonly referred to as an AGB, which stands for Accessory GearBox.

In most cases, the AGB is mounted around the fan casing, or is located in an inter-duct compartment, i.e. in a compartment located between the flow ducts for the primary and secondary flow. Where possible, the AGB is attached in this compartment on an external casing of the high-pressure compressor. The AGB is located at 6 o'clock and is suspended from this external casing by rods. This is particularly the case in the documents U.S. Pat. No. 4,437,627 and US-A1-6,260,351.

However, some turbine engines, particularly those with a relatively high bypass ratio, have a high-pressure compressor and a relatively small-diameter external casing. This external casing is very sensitive to the mechanical deformation, which tends to ovalize it. This distortion is detrimental to the performance of the turbine engine and in particular the high-pressure compressor, as it affects the clearances between the rotor and the stator of this compressor. It is therefore preferable not to mount heavy items of equipment or mechanically stress this external casing during operation.

It is therefore not always possible or desirable to attach or suspend the AGB to the external casing of the high-pressure compressor.

It has already been proposed, for example in the document US-A1-2010/0193631, to mount the AGB in the attachment pylon. However, it is not always possible to integrate the AGB into the pylon, and this configuration is only proposed for turbine engines with a fan (shrouded propeller).

It has also already been proposed to suspend the AGB from an attachment pylon, as in the document FR-A1-2 952 672. Once again, this configuration is only proposed for the turbine engines with a fan (shrouded propeller). In addition, it relates to a type of suspension in which the pylon passes inwards and upstream through the flow duct for the secondary flow to connect to an intermediate casing hub.

If the pylon is attached to the fan casing outside the duct of the secondary flow, there is a risk that the AGB will be located at least partly in the secondary duct and will obstruct a large section of this duct. This is unacceptable from an aerodynamic point of view, as it leads to increased pressure losses and therefore higher fuel consumption by the turbine engine.

The present invention proposes an improvement on current technologies, which allows to solve at least some of the problems and disadvantages mentioned above.

SUMMARY OF THE INVENTION

The invention relates to a support assembly for supporting a main accessory gearbox of an aircraft turbine engine, said accessory gearbox comprising gears and carrying at least one item of equipment driven by these gears, the support assembly being characterized in that it comprises a structure for connecting and supporting the turbine engine to a pylon of the aircraft, the structure comprising:

an intermediate axial segment for attaching to the pylon, comprising an upper end which defines a connecting interface with the pylon, said intermediate segment carrying suspension rods which are intended to be connected to the turbine engine, a front axial segment extending in front of said intermediate segment and comprising at least one suspension member which is intended to be connected to the turbine engine, and a rear axial segment extending to the rear of said intermediate segment and carrying the main accessory gearbox.

The connecting structure of the support assembly according to the invention has many advantages. A first advantage is that it allows the turbine engine to be suspended with front and rear suspensions that are close together and integrated within the structure, resulting in a single suspension structure for suspending the turbine engine. The structure is preferably connected to an upstream portion of the turbine engine, such as an intermediate casing. The turbine engine is then designed to be mounted in a cantilevered manner onto the pylon since it does not comprise a downstream portion, such as a turbine casing, intended to be connected to the pylon.

A second advantage of the invention relates to the hoisting of the turbine engine, which is made easier by the connecting structure. This connecting structure comprises a connecting interface with the pylon which defines an area for coming along the pylon. When the turbine engine is hoisted, it can simply be moved in a single vertical direction from bottom to top, until the structure rests on the pylon at the level of this interface. The structure is then attached to the pylon.

A third advantage relates to the attachment of the accessory gearbox to this connecting structure. The accessory gearbox is therefore not attached directly to the turbine engine, which avoids transmitting mechanical stresses to the turbine engine during operation and limits the aforementioned risk of ovalization of the external casing of the high-pressure compressor of this turbine engine. When the turbine engine is hoisted, the accessory gearbox remains connected to the engine thanks to the connecting structure that joins them together. It is therefore not necessary to dismantle the AGB and disconnect it from the turbine engine when hoisting and attaching the turbine engine to the pylon. The accessory gearbox also retains its advantages in terms of accessibility and maintenance.

The invention is applicable to all types of turbine engine (turbojet, turboprop, APU) installed under an aircraft wing, on a wing or behind the fuselage.

The support assembly according to the invention may comprise one or more of the following characteristics, taken in isolation from each other or in combination with each other:

the connecting interface for connecting to the pylon is substantially flat and extends over an upper end of the rear axial segment of the connecting and support structure;

said rods extend in a first substantially vertical plane, referred to as the intermediate plane;

said at least one suspension member extends in a second substantially vertical plane, referred to as the front plane, this front plane being at an axial distance from the intermediate plane;

said accessory gearbox is suspended from said rear segment by a support device which extends in a third substantially vertical plane, referred to as the rear plane, this rear plane being at an axial distance from the intermediate plane;

said accessory gearbox is connected to first ends of at least two rods, opposite second ends of which are intended to be connected to the turbine engine;

the connecting structure extends along a first axis of elongation contained in a median plane which is perpendicular to said connecting plane, and the accessory gearbox extends on either side of the median plane;

said accessory gearbox comprises a front face through which a power input passes and which may carry at least one item of equipment, and a rear face carrying at least one item of equipment;

said support device extends upwardly from an upper face of the accessory gearbox;

said main accessory gearbox is located at 12 o'clock;

said at least one suspension member is located at a free front end of the second segment;

said at least one suspension member is a snout which comprises:

an attachment rod for attaching to the turbine engine, which extends in said front plane, and a cylindrical body which is engaged in a housing in the free end of the second segment and which is able to pivot in this housing about an axis parallel to said first axis of elongation;

the intermediate axial segment carries three suspension rods in said rear plane, these three rods comprising:

two lateral rods extending respectively on either side of the intermediate axial segment, symmetrically with respect to a vertical median plane passing through said first axis of elongation, and a central rod located under the intermediate axial segment;

the intermediate axial segment has a length L1 measured along the first axis of elongation, which is less than or equal to a length L2 of the front axial segment measured along this axis; alternatively, L1 is greater than or equal to L2;

the front axial segment comprises an upper platform for attaching at least one root of a rectifier vane;

the or each rectifier vane is a stationary vane or a variable pitch vane.

The present invention also relates to an aircraft turbine engine, comprising a support assembly for supporting a main accessory gearbox as described above, the turbine engine being configured to be mounted in a cantilevered manner on a pylon by means of the connecting structure of the support assembly.

The turbine engine according to the invention may comprise one or more of the following characteristics, taken in isolation from each other, or in combination with each other:

the turbine engine comprises a gas generator which has a longitudinal axis and drives a non-shrouded propeller, the gas generator comprising, from upstream to downstream, in the direction of flow of the gases, at least one compressor, an annular combustion chamber and at least one turbine, the gas generator defining a main annular flow duct for a first air flow and being intended to be surrounded by a secondary annular flow duct for a second air flow, the connecting structure being attached to the gas generator so that an axis of elongation of the connecting structure is located at a radius measured with respect to the longitudinal axis, which is between the minimum radius and the maximum radius of the propeller;

the gas generator comprises two compressors, low pressure and high pressure respectively, and an intermediate casing interposed axially between these two compressors, said accessory gearbox being situated just downstream of this intermediate casing;

said intermediate casing comprises a central hub connected by radial arms to an annular shell extending around the central hub, this annular shell being connected to said suspension rods of said intermediate segment;

the accessory gearbox is connected to said annular shell by at least two rods;

a power input of the accessory gearbox is connected to an intermediate gearbox which is itself connected by another substantially radial shaft to gears for collecting power from a shaft of the gas generator;

the turbine engine further comprises a secondary accessory gearbox comprising:

at least one shaft connected to a starter, and at least one shaft connected to an electric generator or a hydraulic pump, this electric generator or hydraulic pump being connected to an electric motor or to a hydraulic turbine mounted on the main accessory gearbox, in order to supply electric or hydraulic power to this electric motor or to this hydraulic turbine;

said secondary accessory gearbox is attached to said hub of the intermediate casing;

said starter is an electric starter/generator, a hydraulic pump or an air starter;

said structure has a generally elongated shape, said turbine engine is of the shrouded or non-shrouded type, said secondary duct is shrouded or non-shrouded;

said propeller is located upstream of the main and secondary ducts;

alternatively, the propeller is located downstream of these ducts;

the connecting structure is attached to the gas generator downstream of the propeller; alternatively, the connecting structure is attached to the gas generator upstream of the propeller;

the turbine engine comprises an annular row of rectifier vanes which is located downstream of the propeller in the secondary duct, the second segment of the structure being located between two adjacent vanes of that row of vanes or carrying one of the vanes of that row of vanes;

the rectifier vanes are either stationary or variable pitch vanes;

the rectifier vanes are located downstream of the propeller in the secondary duct;

said front plane is located upstream of or in line with leading edges of the vanes in the vane row, and/or said rear plane is located downstream of trailing edges of the vanes in the vane row;

the assembly further comprises a pylon having a second axis of elongation and comprising a front end for attaching to the first segment of the structure;

the assembly also comprises thrust-reacting bars or rods, these rods comprising front ends attached to the gas generator and rear ends connected to a rudder attached to the pylon, behind the structure.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
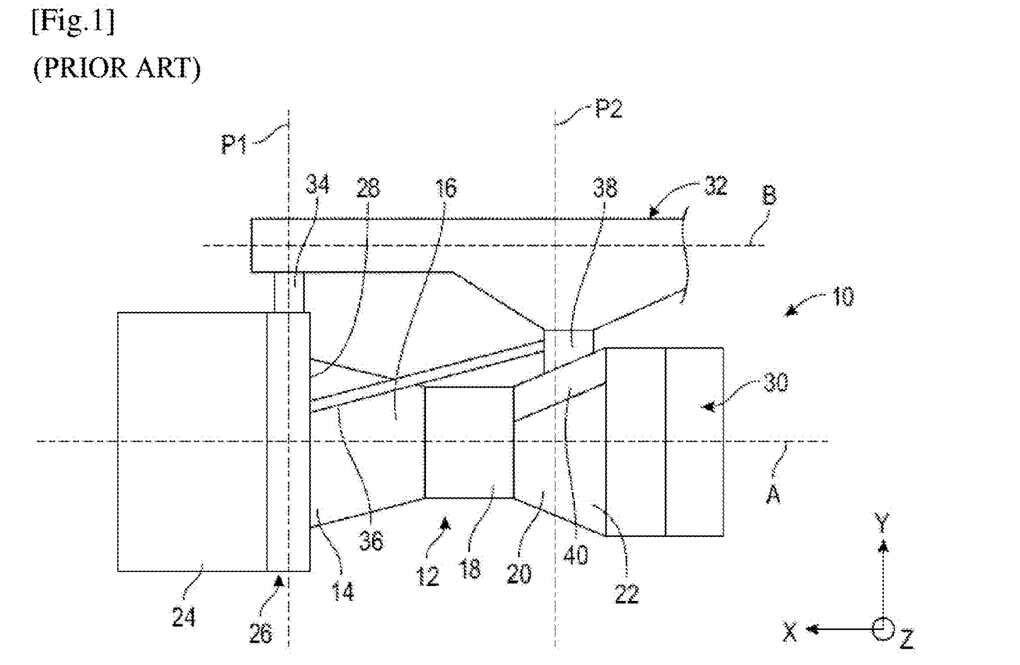
FIG. 1 is a very schematic view of an assembly comprising an aircraft turbine engine and its hooking pylon, according to the technique prior to the invention.

FIG. 1 shows a turbine engine 10 for an aircraft, this turbine engine 10 being a turbofan engine with double flow and double body.

The axis A is the longitudinal axis of the turbine engine. The orthonormal reference frame XYZ is shown in some figures, including FIG. 1. The direction X is parallel to the axis X and oriented towards the upstream or the front of the turbine engine 10, the axis Y is oriented upwards, and the axis Z is oriented towards one side.

The turbine engine 10 comprises a gas generator 12 which comprises, from upstream to downstream with reference to the flowing of the gases along the axis A, a LP or low-pressure compressor 14, a HP or high-pressure compressor 16, an annular combustion chamber 18, a HP or high-pressure turbine 20 and a LP or low-pressure turbine 22.

Although not visible in FIG. 1, the rotor of the HP compressor 16 is connected to the rotor of the HP turbine 20 by a high-pressure shaft, and the rotor of the BP compressor 14 is connected to the rotor of the BP turbine 22 by a low-pressure shaft which passes through the high-pressure shaft and which drives in rotation a propulsion propeller located upstream of the gas generator 12 and which is surrounded by an annular casing referred to as the fan casing 24.

The fan casing 24 is connected to the gas generator 12 by an intermediate casing 26 which comprises a central hub 28 and a series of radial arms connecting the hub 28 to the fan casing 24.

The gas generator 12 defines a main annular flow duct for a first air flow, referred to as the primary flow. The gas generator 12 is surrounded by a secondary annular flow duct for a second air flow, referred to as the secondary flow.

The air flow entering the fan is divided into one portion forming the primary flow. The air in this primary flow is compressed in the LP 14 and HP 16 compressors, then mixed with fuel and burnt in the combustion chamber 18. The combustion gases from the primary flow are then expanded in the HP 20 and LP 22 turbines and finally flow into an exhaust nozzle 30.

The other portion of the air flow entering the fan forms the secondary flow which flows around the gas generator 12 and is intended to be mixed with the primary flow downstream of the nozzle 30.

The turbine engine 10 is attached to an element of the aircraft by means of a pylon 32 which has a generally elongated shape along the axis A and therefore comprises an axis of elongation B parallel to the axis A. The pylon 32 comprises attachment members 34, 38 for attaching and suspending the turbine engine 10.

Figure 2:
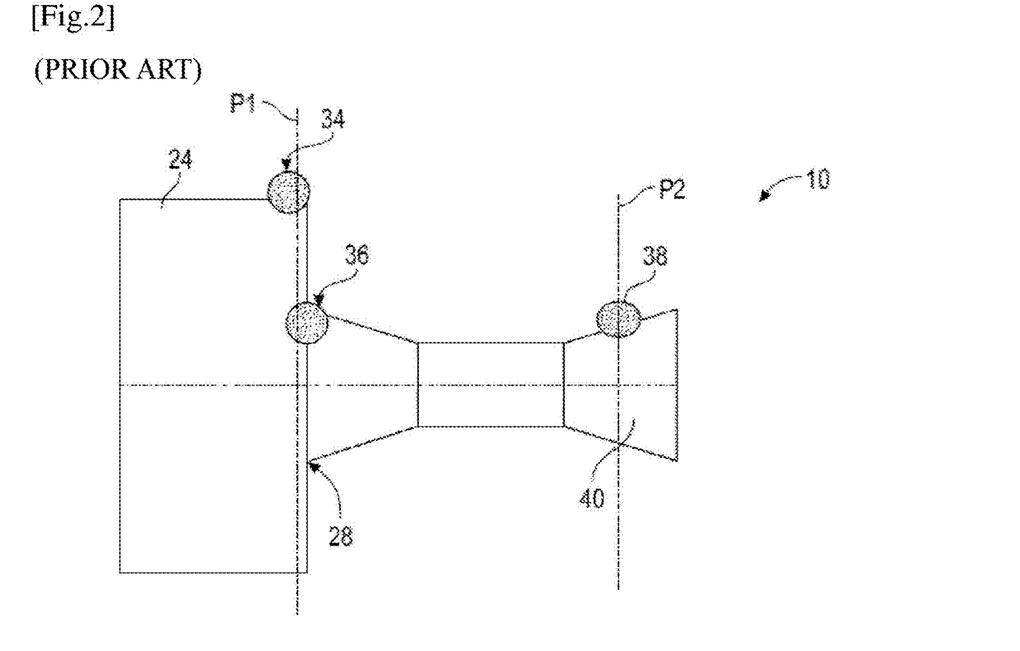
FIG. 2 is a very schematic view of an aircraft turbine engine and shows the attachment and suspension points on a hooking pylon, according to the technique prior to the invention.
Figure 3:
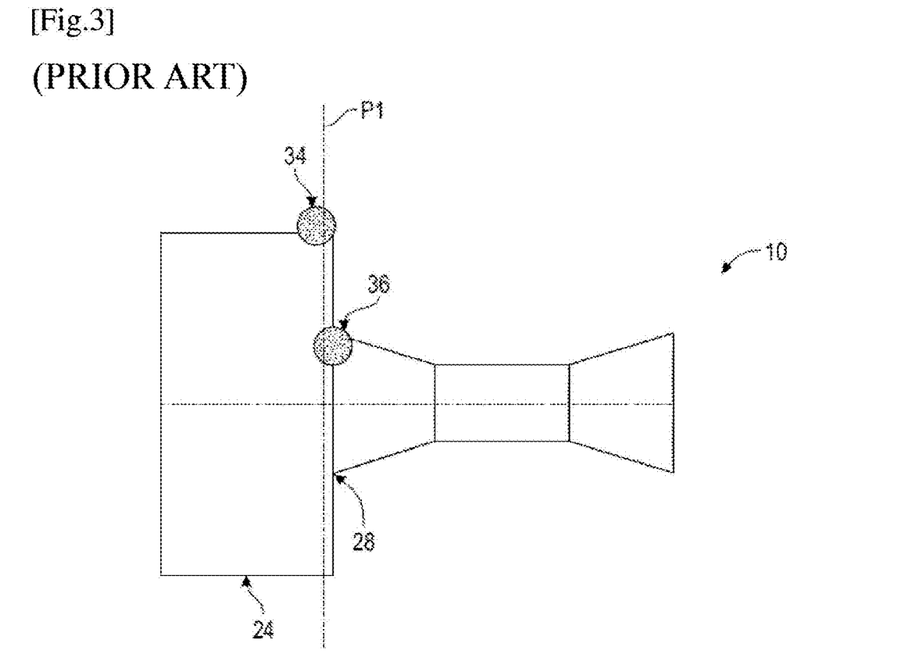
FIG. 3 is a very schematic view of another aircraft turbine engine and shows attachment and suspension points on a hooking pylon, according to the technique prior to the invention.

FIGS. 1 to 3 illustrate the prior art prior to the present invention.

In the first case illustrated in FIGS. 1 and 2, there are three points or areas where the pylon 32 is attached to the turbine engine 10. Two of the points are located in an upstream or front plane P1 perpendicular to the axis A and the last point is located in a downstream or rear plane P2 perpendicular to the axis A.

At the level of the plane P1, a first attachment member 34 ensures the connection of the pylon 32 to the fan casing 24. At the level of the plane P2, the attachment member 38 ensures the attachment of the pylon 32 to a turbine or exhaust casing 40. This attachment member 38 is also connected to the hub 28 of the intermediate casing 26 by thrust-reacting bars or rods 36. These bars 36 ensure the transmission of the thrust from the turbine engine 10 to the pylon 32 and therefore to the aircraft.

In the second case shown in FIG. 3, there are only the two attachment points in the aforementioned plane P1, so the turbine engine is attached in a cantilever manner to the pylon 32. In this case, at the level of the plane P1, the attachment member 34 ensures the connection of the pylon 32 to the fan casing 24, and thrust-reacting rods 36 ensure the connection of the hub 28 of the intermediate casing 26 to the pylon 32, by means of an attachment member (not shown) which is attached to the pylon without being attached to the turbine engine.

Figure 4:
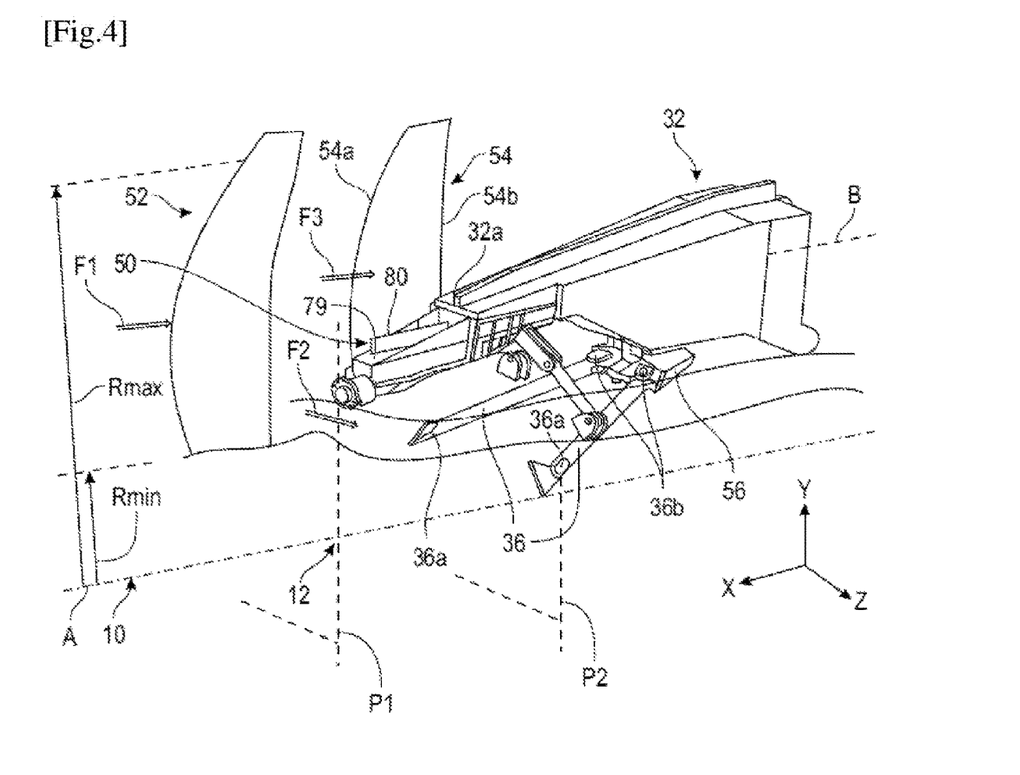
FIG. 4 is a schematic perspective view of an assembly comprising an aircraft turbine engine, a hooking pylon and a structure connecting the turbine engine to the pylon.

FIG. 4 illustrates a connecting structure 50 for connecting and attaching in a cantilevered manner an aircraft turbine engine 10 to a pylon 32.

The turbine engine 10 is shown in part in FIG. 4 and the above description in relation to FIG. 1 can be applied to the turbine engine 10 of FIG. 4 except in relation to the attachment of the turbine engine 10 to the pylon 32. In this figure, the fan casing 24 is not shown, as this technology applies to a propeller 52 which is shrouded by such a casing 24 to form a fan, or which on the contrary is not shrouded.

The propeller 52 comprises vanes that extend radially with respect to the axis A of the turbine engine 10. The vanes of the propeller 52 extend between a minimum radius Rmin measured at the level of the roots of the vanes from the axis A, and a maximum radius Rmax measured from the summits of the vanes from the axis A.

As mentioned above, the air flow F1 which passes through the propeller 52 is divided downstream of the propeller 52 into a primary flow F2 which flows into the gas generator 12, and a secondary flow F3 which flows around the gas generator 12.

Downstream of the propeller 52, the turbine engine 10 comprises stationary rectifier vanes 54, commonly referred to as OGV (acronym for Outer Guide Vanes). These vanes 54 extend radially with respect to the axis A from a shell of the intermediate casing 26.

The pylon 32 has its axis of elongation B parallel to the axis A and its upstream or front end is located downstream of the trailing edges 54b of the vanes 54. The pylon 32 has its front end 32a which is located at or above the intermediate casing 26.

A specificity of the assembly is the position of the pylon 32 in relation to the secondary flow F3. Unlike the prior art in FIG. 1, where the pylon 32 extends at a radial distance from the gas generator 12, the pylon 32 in FIG. 4 extends as close as possible to the gas generator 12. The axis of elongation B is therefore located at a radius from the axis A, which is between Rmin and Rmax.

As mentioned above in relation to FIG. 3, the turbine engine 10, which is attached in a cantilevered manner to the pylon 32, is connected to the latter by thrust-reacting rods 36.

The two rods 36 are arranged symmetrically with respect to a vertical median plane passing through the axis A. They each comprise front ends 36a attached to the gas generator 12, for example at the level of the intermediate casing 26, and rear ends 36b connected to a rudder 56 attached to the pylon 32, at a distance from its axial end 32a. The ends 36a, 36b of the rods 36 are preferably hinged by ball-and-socket joints, respectively to clevises secured to the intermediate casing 26, and clevises secured to the rudder 56.

The turbine engine 10 is attached and suspended from the pylon 32 by means of a single connecting structure 50 which defines two planes, front P1 and rear P2 respectively, for suspending the turbine engine to the pylon.

As can be seen in FIG. 4, the connecting structure 50 is located at the level of the front end 32a of the pylon 32, so that the rear suspension plane of the turbine engine 10 is brought closer to the front and to the front plane P1, allowing the turbine engine 10 to be mounted in a cantilevered manner.

Reference is now made to FIGS. 5 to 8, which allow a clearer view of the characteristics of the connecting structure 50.

The connecting structure 50 has a generally elongated shape and has an axis of elongation C parallel to the axes A, B.

The structure 50 essentially comprises two axial segments, namely:
- an intermediate axial attachment segment 50a for attaching to the pylon 32, which is a rear segment, and
- a front axial segment 50b intended to extend in front of the pylon 32 and which is therefore a front segment.

Figure 5:
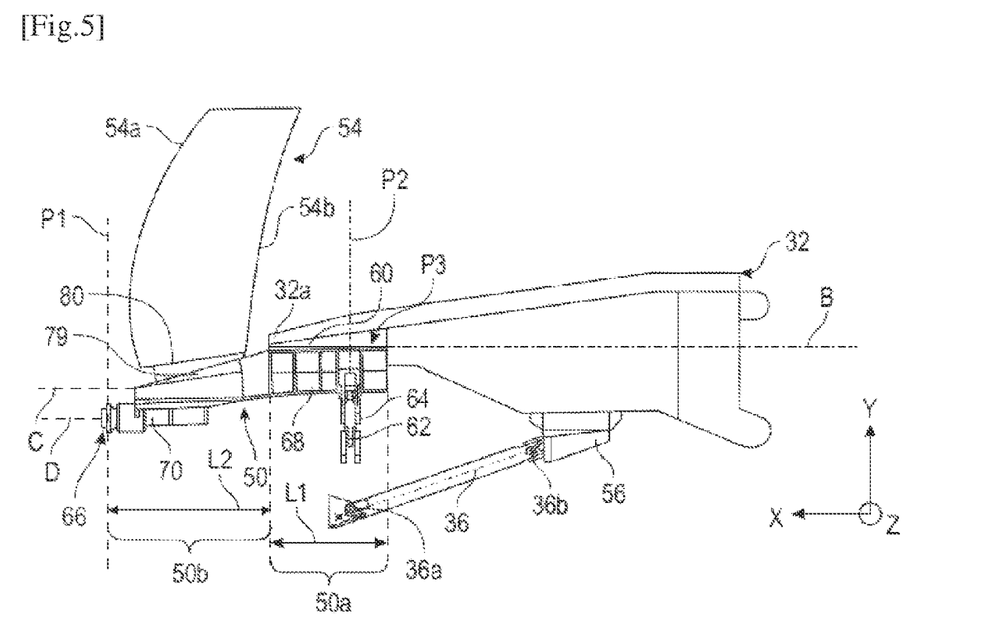
FIG. 5 is a schematic side view of the pylon and of the connecting structure of FIG. 4.

Although this is not limiting, FIG. 5 shows that the intermediate segment 50a has a length L1 measured along the axis C, which is less than or equal to the length L2 of the front segment 50b measured along this axis.

The intermediate segment 50a comprises an upper end 60 which defines a substantially horizontal plane P3 interfacing with the pylon 32.

Figure 8:
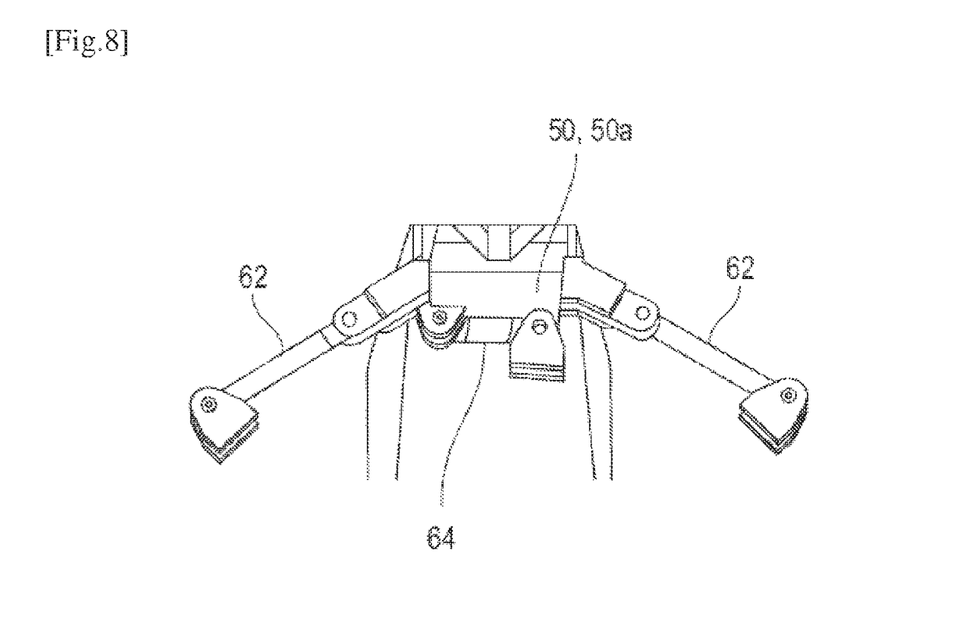
FIG. 8 is a schematic perspective view of the rear suspension rods of the connecting structure of FIG. 4.

This intermediate segment 50a also comprises a lower end carrying suspension rods 62, 64 which are intended to be connected to the turbine engine 10 and which extend in the rear plane P2.

Figure 6:
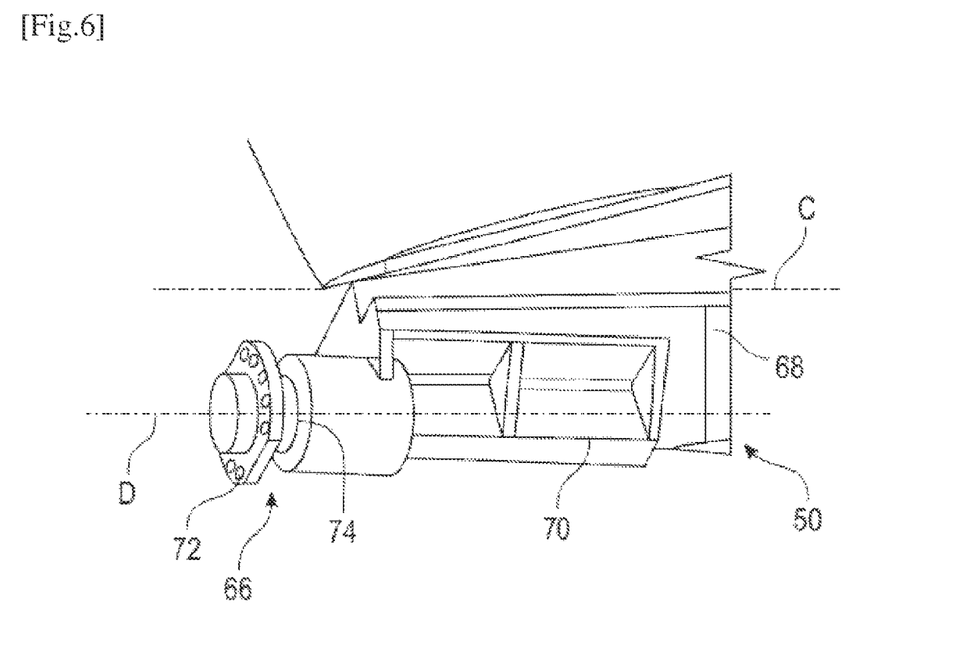
FIG. 6 is a schematic perspective view of a front suspension member of the connecting structure of FIG. 4.

The front segment 50b comprises at least one suspension member 66 which is intended to be connected to the turbine engine 10 and which extends in the front plane, P1.

Figure 7:
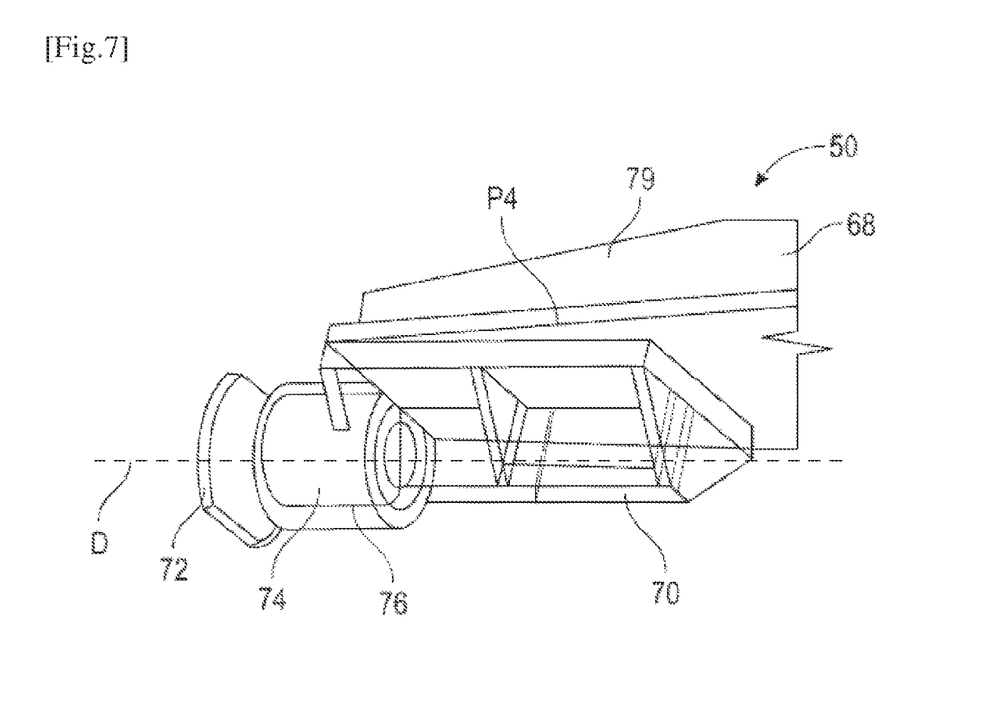
FIG. 7 is a schematic perspective view of the front suspension member of the connecting structure of FIG. 4.

The connecting structure 50 can be formed from a single piece or from several pieces assembled together. Advantageously, it comprises a main beam 68 which forms the intermediate segment 50a and an upper portion of the front segment 50b. The lower portion of the front segment 50b is then formed by a structural part 70 fitted and attached under the beam 68, as shown in FIG. 7, but which can be integrated into this beam 68. The interface plane P4 between the beam 68 and the part 70 may be substantially horizontal.

The suspension member 66 is located at a free front end of front segment 50b and is formed here by a snout which comprises:
- an attachment flange 72 for attaching to the turbine engine 10, which extends in said front plane P1, and
- a cylindrical body 74 which engages in a housing 76 in the free end of the front segment 50b, and in particular in the part 70. The body 74 is able to pivot in this housing 76 about an axis D parallel to the axis of elongation C. It is thus understood that, in the front plane P1, the connecting structure 50 is connected to the turbine engine 10 by a sliding pivot connection allowing rotational movements about the axis D.

The member 66 may be configured to allow the turbine engine 10 a degree of freedom along the axis X. In other words, the member 66 may not be configured to take up the forces of the turbine engine 10 and transmit them to the pylon 32 in the direction X. Advantageously, therefore, the member 66 is configured to take up the forces in the directions Y and Z.

In the example shown, the connecting structure 50 comprises three suspension rods 62, 64 in the rear plane P2, including:
- two lateral rods 62 extending respectively on either side of the intermediate segment 50a, symmetrically with respect to a vertical median plane passing through the axis C, and
- a central rod 64 located under the intermediate segment 50a.

The ends of rods 62 and 64 are hinged by ball-and-socket joints respectively to clevises 78 secured to the gas generator (in particular at the intermediate casing), and to the segment 50a.

Figure 10:
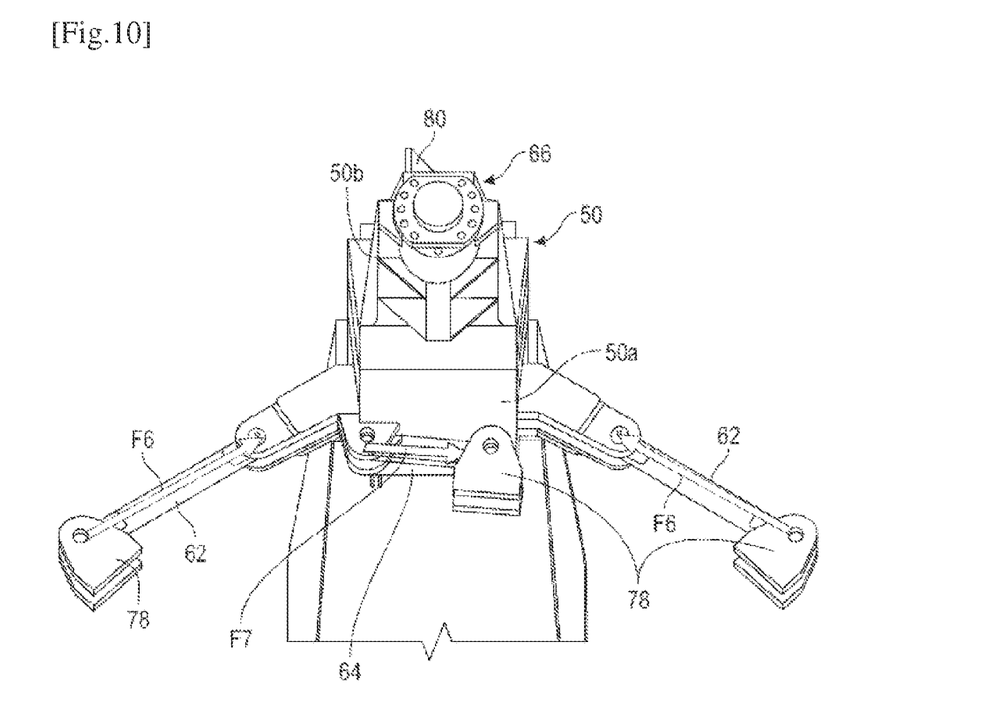
FIG. 10 is a schematic front perspective view of the connecting structure and of the pylon of FIG. 4, and illustrate the moments that apply in operation at the points where the structure is connected to the turbine engine.

The rods 62, 64 are configured to take up and transmit the forces applied to the turbine engine in the directions Y and Z and the moments in the direction X. FIG. 10 shows that the forces in the directions Y and Z are taken up by the rods 62 (arrows F6), and that the rod 64 takes up the moments in the direction X (arrow F7).

The thrust-reacting rods (36) take up the forces in the direction X.

As can be seen in FIG. 4 in particular, the connecting structure 50 extends forwards in the extension of the pylon 32 and is attached to the gas generator 12, downstream of the propeller 52, so that its axis of elongation C is located at a radius measured with respect to the axis A, which is between the radii Rmin and Rmax.

The front segment 50b of the structure 50 is located at the level of the stationary vanes 54 and two configurations are possible.

According to a first configuration illustrated in FIG. 5, the front segment 50b of the structure 50 carries one of the vanes 54.

In this case, the front segment 50b comprises an upper platform 79 configured to be connected or secured to a vane 54, in particular to the vane located at 12 o'clock. In practice, this upper platform 79 can carry a root blank 80 configured to be attached to the root of a vane 54.

According to another configuration not shown, the front segment 50b of the structure 50 is located between two adjacent vanes 54.

In a variant not shown, the vanes 54 are of the variable pitch type and are therefore each able to be angularly positioned around a radial axis at a precise angle. In this case, the structure 50 may comprise a mechanism for guiding the root of the vane 54, such as a rolling, or an actuation system comprising, for example, rods, a gear, an actuator, etc.

In yet another variant not shown, the structure 50 could support two or more vanes 54.

FIG. 5 shows that, in the example shown, the front plane P1 is located upstream of or in line with the leading edges 54a of the vanes 54, and the rear plane P2 is located downstream of the trailing edges 54b of the vanes 54 and is intended to pass at the level of the intermediate casing of the turbine engine.

Figure 9:
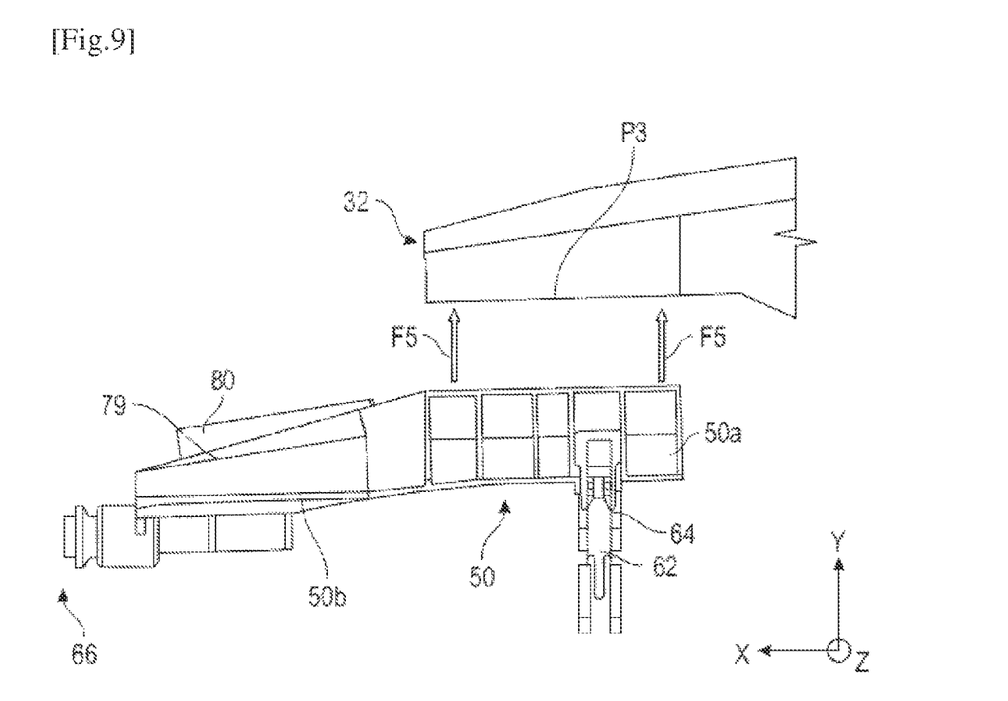
FIG. 9 is a schematic side view of the connecting structure of FIG. 4 during a hoisting step towards the pylon.

FIG. 9 illustrates a step and a method for hoisting a turbine engine 10 equipped with the connecting structure 50 to the pylon 32.

Although the turbine engine is not shown in this drawing, it should be understood that the structure 50 is previously attached to the turbine engine, i.e. the flange 72 of its member 66 is attached to a complementary flange of the gas generator 12, upstream of or in line with the leading edges

54a of the vanes 54, as mentioned above, and the rods 62, 64 are also attached to the gas generator. The structure 50 therefore has the advantage of being able to be attached to the turbine engine in the assembly line of the latter. The thrust-reacting rods 36 can also be attached to the turbine engine 10.

The turbine engine can be moved on the ground by means of a carriage or suspended and moved by one or more hoists.

The turbine engine is positioned under the pylon 32 so that the axes B and C are parallel and the segment 50a of the structure 50 is located just below the pylon 32, as shown in FIG. 9. The turbine engine is then hoisted towards the pylon 32 by a single vertical translation movement from the bottom to the top (arrows F5), until the segment 50a and the pylon are supported in the interface plane P3.

The structure 50 can then be attached to the pylon 32, for example by screw-nut type means or similar. The rudder 56 attached to the rods 36 can also be attached to the pylon behind the structure 50, as shown in FIG. 5.

FIGS. 11 to 15 illustrate a preferred embodiment of the present invention which uses a connecting structure 50 as described above, and which relates to a support assembly for supporting a main accessory gearbox 82 of a turbine engine, said assembly comprising this connecting structure 50.

The turbine engine 10 is of the same type as that shown in FIG. 4 and described above. However, the invention is not limited to this type of turbine engine (with a non-shrouded fan) and could be applied to another type of turbine engine, such as a turbine engine with a shrouded fan of the double flow turbojet type, for example.

The foregoing description of the turbine engine 10 therefore applies to the turbine engine of FIGS. 11 to 15 and the reference numbers used in the foregoing are therefore retained.

The connecting structure 50 according to the invention differs from that described above in that it also comprises a third axial segment, namely a rear axial segment 50c which extends to the rear of the intermediate segment 50a and is intended to extend under the pylon 32. This rear axial segment 50c can be formed in a single piece with the intermediate segment 50a.

According to the invention, this rear segment 50c carries a main accessory gearbox 82, also referred to as an AGB as mentioned above.

This accessory gearbox 82 comprises at least one power input 88 and gears (not visible) coupled to at least one output shaft (not visible) intended to drive at least one item of equipment 86.

Such items of equipment 86 may comprise, for example, an electric motor, an electric generator, a hydraulic pump, etc., as will be described in more detail below.

In the configuration shown in the drawings, the accessory gearbox 82 is located at 12 o'clock and just downstream of the intermediate casing 26.

Figure 15:
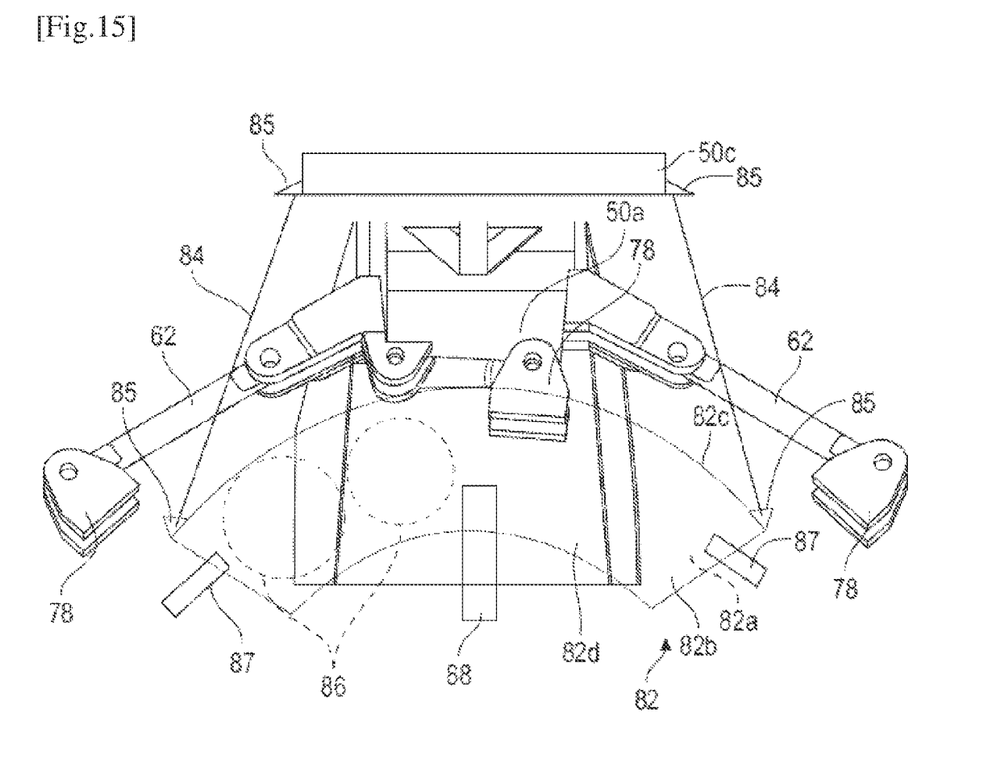
FIG. 15 is similar to FIGS. 8 and 10 and shows the connecting rods of the accessory gearbox.

In the example shown, the accessory gearbox 82 comprises a front face 82a facing upstream, a rear face 82b facing downstream, and upper 82c and lower 82d faces which join the faces 82a, 82b together. As shown in FIG. 15, the accessory gearbox 82 may have a generally curved shape around the turbine engine 10. The upper face 82c then has a convex curved shape and the lower face 82d has a concave curved shape. The faces 82a, 82b can have a radial or perpendicular orientation to the axis A of the turbine engine 10.

The items of equipment 86 is generally located on the front face 82a and/or the rear face 82b of the accessory gearbox 82.

Figure 11:
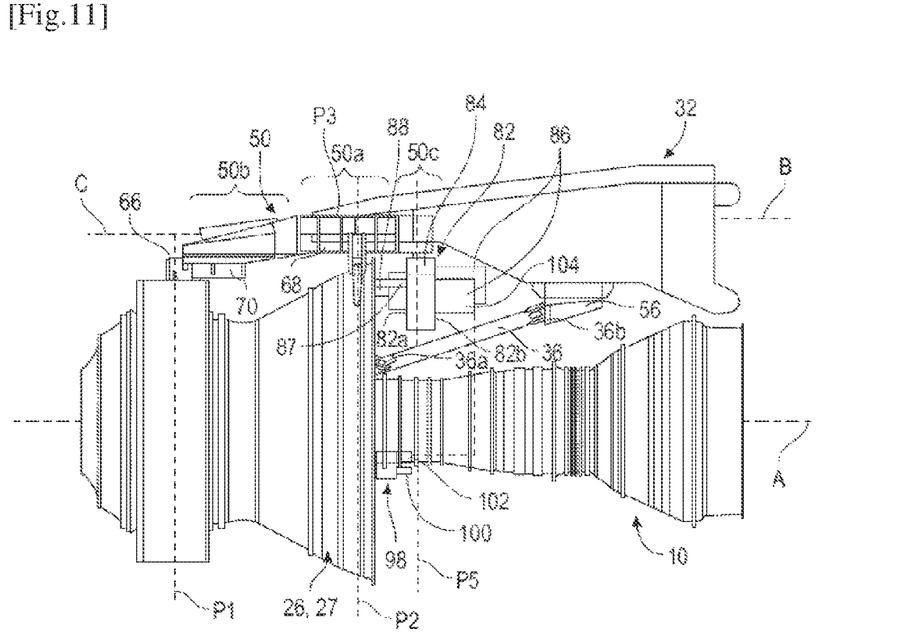
FIG. 11 is a schematic perspective view of an assembly comprising an aircraft turbine engine, a hooking pylon, and a structure for connecting the turbine engine to the pylon, according to one embodiment of the present invention.
Figure 12:
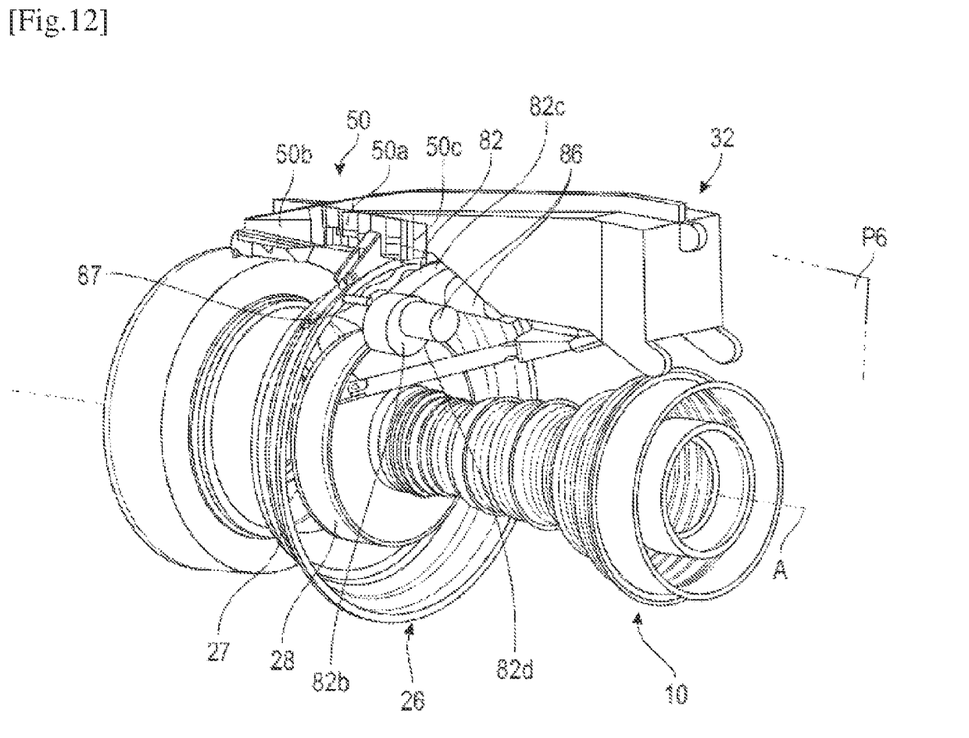
FIG. 12 is another schematic perspective view of the assembly shown in FIG. 11.
Figure 13:
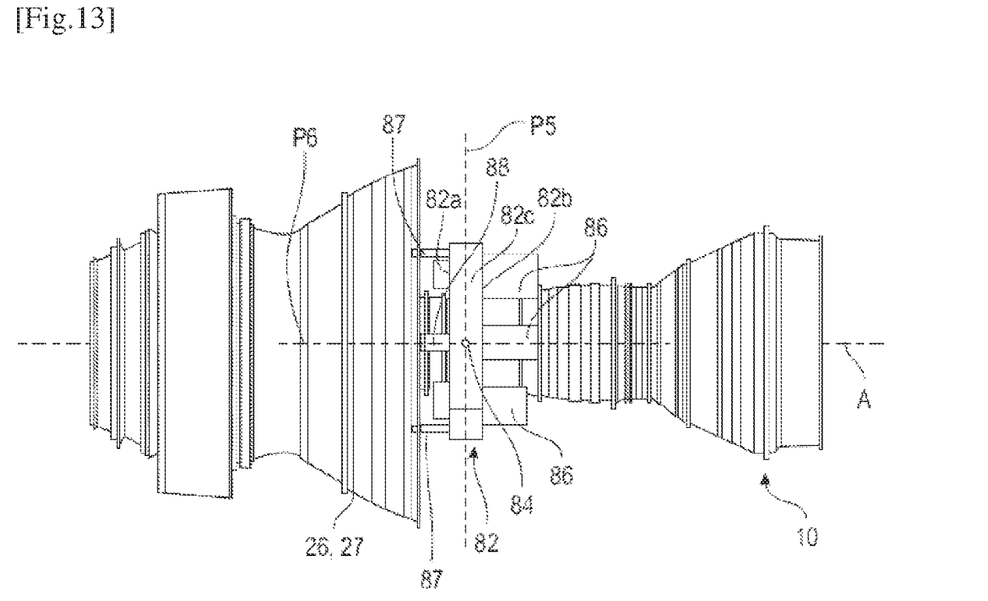
FIG. 13 is another schematic perspective view of the assembly shown in FIG. 11, without the hooking pylon.

The accessory gearbox 82 is suspended from the rear segment 50c of the connecting structure 50 by at least one support device 84, which may comprise at least one rod.

As can be seen in FIG. 13, this support device 84 extends in a third, substantially vertical plane, referred to as the rear plane P5. This rear plane P5 is at an axial distance from the intermediate plane P2 described above.

The axis of elongation C of the connecting structure 50 is contained in a median plane P6 which is perpendicular to the connecting plane P3 and which passes substantially through this support device 84 in the example shown in FIG. 13. This device 84 may comprise at least one rod which extends to the structure from the upper face 82c of the accessory gearbox 82.

In the alternative embodiment shown in FIG. 15, the support device 84 comprises two rods which extend respectively from the connecting structure 50 to the opposite ends of the accessory gearbox 82. The rear axial segment 50c and the ends of the rods may comprise clevises 85 for hinging to the rods. These rods are therefore located on either side of the aforementioned plane P6.

FIGS. 11 to 13 show that the accessory gearbox 82 is connected to first ends of at least two rods 87, opposite second ends of which are connected to the turbine engine 10, and more particularly to a shell 27 of the intermediate casing 26. This shell 27 is connected to the hub 28 of the intermediate casing 26 by radial arms which are not shown in the drawings for the sake of clarity.

The median plane P6 passes substantially between the rods 87 and, for example, at an equal distance from those rods 87, as shown in FIG. 13. These rods 87 extend upstream as far as the shell 27 from the front face 82a of the accessory gearbox 82.

The support device 84 and the rods 87 are preferably positioned and configured to ensure an isostatic mounting of the accessory gearbox 82.

The rods 87 are also preferably configured to allow (micro) movements in all three directions relative to the intermediate casing 26.

The aforementioned median plane P6 also passes substantially through the power input 88 of the accessory gearbox 82. This power input 88 can be a power transmission shaft, a conduit or cable for the passage of electrical, hydraulic or pneumatic power, etc.

Figure 14:
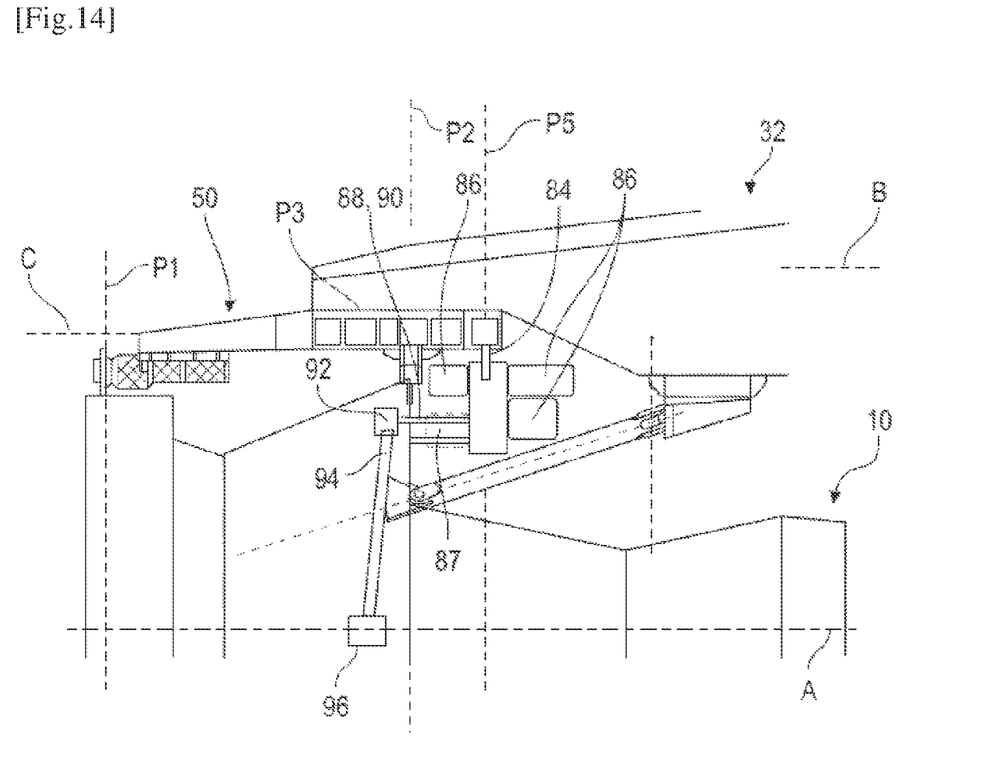
FIG. 14 is a view similar to FIG. 11.

In the example shown in FIG. 14, this power input 88 is formed by a shaft 90 which passes through the front face 82a of the accessory gearbox 82.

The shaft 90 extends substantially parallel to the axis C and is connected to an intermediate gearbox 92 (also referred to as TGB, an acronym for Transfer GearBox). This TGB is itself connected by another substantially radial shaft 94 to an internal gearbox 96 (also referred to as IGB, acronym for Inlet GearBox). The TGB is attached, for example, to the shell 27 of the intermediate casing 26. The IGB is mounted in the gas generator and allow to collect the power from a shaft of an engine.

The coupling of an AGB to a shaft of the gas generator, by means of a TGB and an IGB, is described for example in the document FR-A1-3 017 660.

The shaft 90 is preferably connected to the AGB and to the TGB by flexible devices (typically curved splines or cardan type coupling devices) which allow movement in all three directions.

FIG. 11 shows that the assembly according to the invention may also comprise a secondary accessory gearbox 98 which is preferably attached to the hub 28 of the intermediate casing 26 and which comprises:

at least one shaft connected to a starter 100,
and at least one shaft connected to an electric generator 102 or a hydraulic pump.

A secondary accessory gearbox 98 may, for example, be connected to the hub of the intermediate casing and collect the mechanical power from a shaft of the gas generator in a manner known per se, as in the case of the accessory gearbox described in the application FR-A1-3 017 660.

The electrical generator 102 is preferably connected to an electric motor 104 mounted on the main accessory gearbox 82, in order to supply power to this electric motor 104. This type of architecture is known as distributed electrical architecture.

In the variant where the generator 102 is replaced by a hydraulic pump, this pump is connected to a hydraulic motor or turbine mounted on the main accessory gearbox 82, for the hydraulic power of this pump. This is the hydraulic transposition of the distributed electrical architecture.

The starter 100 can be an electric starter/generator, a hydraulic pump, an air starter, etc.

The engine 104 forms one of the items of equipment 86 of the accessory gearbox 82.

Another of these items of equipment 86 may be an air-powered turbine (for example to drive the gears and therefore the items of equipment). This turbine can be powered by air collected from the high-pressure compressor.

The present invention provides several advantages such as:
- no longer using the external casing of the high-pressure compressor to suspend the AGB located in the interduct compartment;
- making it easier to hoist the turbine engine by means of the connecting structure, without having to intervene on the AGB, for example to disconnect it;
- not affecting the accessibility and the maintenance of the AGB compared with the solutions currently used;
- having an isostatic suspension of the AGB, making it easy to size;
- reducing the length of the EBU, which are the connecting elements between the aircraft and the engine systems (electricity, hydraulics and fuel), and therefore reduce the weight of the EBU; this advantage is inherent in the 12 o'clock position of the AGB, so there is necessarily less length to allow for the connecting elements (which pass through the pylon) between the aircraft and the systems mounted on the AGB, compared with an AGB installed at 6 o'clock.

What is claimed is:

1. A support assembly for supporting a main accessory gearbox of an aircraft turbine engine having a longitudinal axis, the main accessory gearbox comprising gears and carrying at least one item of equipment driven by the gears, the support assembly comprising a structure for connecting and supporting the turbine engine to a pylon of the aircraft, the structure comprising:
   an intermediate axial segment for attaching to the pylon and having an upper end which defines a connecting interface with the pylon, the intermediate axial segment carrying suspension rods which are configured to be connected to the turbine engine;
   a front axial segment extending in front of the intermediate segment and having at least one suspension member which is intended to be connected to the turbine engine; and
   a rear axial segment extending to the rear of the intermediate segment and carrying the main accessory gearbox, wherein the main accessory gearbox extends in each of the clockwise and counterclockwise directions from a vertical median plane passing through the longitudinal axis of the turbine engine.

2. The support assembly of claim 1, wherein:
   the rods extend in a first substantially vertical plane, referred to as the intermediate plane;
   the at least one suspension member extends in a second substantially vertical plane, referred to as the front plane, the front plane being at an axial distance from the intermediate plane; and
   the accessory gearbox is suspended from the rear segment by a support device which extends in a third substantially vertical plane, referred to as the rear plane, the rear plane being at an axial distance from the intermediate plane.

3. The support assembly of claim 1, wherein the accessory gearbox is connected to first ends of at least two rods, opposite second ends which are intended to be connected to the turbine engine.

4. The support assembly of claim 1, wherein the connecting interface for connecting to the pylon is substantially flat and extends over an upper end of the rear axial segment of the connecting and support structure.

5. The support assembly of claim 4, wherein the connecting structure extends along a first axis of elongation contained in a median plane which is perpendicular to the connecting interface, and the accessory gearbox extends on either side of the median plane.

6. The support assembly of claim 1, wherein the accessory gearbox comprises a front face passed through by a power input and carrying at least one item of equipment, and a rear face carrying at least one item of equipment.

7. The support assembly of claim 1, wherein a support device extends upwardly from an upper face of the accessory gearbox and comprises at least one rod.

8. An aircraft turbine engine comprising a support assembly for supporting a main accessory gearbox according to claim 1, the turbine engine being configured to be mounted in a cantilevered manner on a pylon by means of the connecting structure of the support assembly.

9. The turbine engine of claim 8, further comprising a gas generator which has a longitudinal axis and drives a non-shrouded propeller, the gas generator comprising from upstream to downstream, in the direction of flow of the gases:
   at least one compressor;
   an annular combustion chamber; and
   at least one turbine, wherein the gas generator defines a main annular flow duct for a first flow of air and configured to be surrounded by a secondary annular flow duct for a second flow of air, and wherein the connecting structure is attached to the gas generator so that an axis of elongation of the connecting structure is situated at a radius measured with respect to the longitudinal axis, which is between a minimum radius (Rmin) and a maximum radius (Rmax) of the propeller.

10. The turbine engine of claim 8, wherein the gas generator comprises two compressors, a low-pressure compressor and a high-pressure compressor, respectively, and an intermediate casing interposed axially between the two compressors, and wherein the accessory gearbox is situated just downstream of the intermediate casing.

11. The turbine engine of claim 10, wherein the intermediate casing comprises a central hub connected by radial arms to an annular shell extending around the central hub, and wherein the annular shell is connected to the suspension rods of the intermediate segment.

12. The turbine engine of claim 11, wherein the accessory gearbox is connected to the annular shell by at least two rods.

13. The turbine engine of claim 8, wherein a power input of the accessory gearbox is connected to an intermediate gearbox which is itself connected by another substantially radial shaft to gears for collecting power from a shaft of the gas generator.

14. The turbine engine of claim 8, further comprising a secondary accessory gearbox which comprises:
    at least one shaft connected to a starter; and
    at least one shaft connected to an electric generator or a hydraulic pump, wherein the electric generator or the hydraulic pump are connected to an electric motor or to a hydraulic turbine mounted on the main accessory gearbox in order to supply the electric or hydraulic power to the electric motor or of the hydraulic turbine.

15. The turbine engine of claim 10, wherein a secondary accessory gearbox is attached to a hub of the intermediate casing.

16. A support assembly for supporting a main accessory gearbox of an aircraft turbine engine having a longitudinal axis, the main accessory gearbox including gears and carrying at least one item of equipment driven by the gears, the support assembly having a structure for connecting and supporting the turbine engine to a pylon of the aircraft, the structure comprising:
    an intermediate axial segment for attaching to the pylon and having an upper end which defines a connecting interface with the pylon, the intermediate axial segment carrying suspension rods which are configured to be connected to the turbine engine;
    a front axial segment extending in front of the intermediate segment and having at least one suspension member which is intended to be connected to the turbine engine; and a rear axial segment extending to the rear of the intermediate segment and carrying the main accessory gearbox, wherein the main accessory gearbox is positioned in a space partially delimited by a lower surface of the rear axial segment and a plane, wherein suspension rods of the rear axial segment are configured to be connected to the turbine engine when the structure is secured to the turbine engine, and wherein the suspension rods of the rear axial segment lie in the plane.

\* \* \* \* \*